US010488300B2

(12) United States Patent
Kobayashi et al.

(10) Patent No.: US 10,488,300 B2
(45) Date of Patent: Nov. 26, 2019

(54) VIBRATION EXCITER

(71) Applicant: HONDA MOTOR CO., LTD., Minato-Ku, Tokyo (JP)

(72) Inventors: Kota Kobayashi, Tochigi (JP); Ichiro Kono, Tochigi (JP); Takeshi Kondo, Tochigi (JP); Taishi Yamada, Tochigi (JP)

(73) Assignee: Honda Motor Co., Ltd., Tokyo (JP)

( * ) Notice: Subject to any disclaimer, the term of this patent is extended or adjusted under 35 U.S.C. 154(b) by 224 days.

(21) Appl. No.: 15/654,175

(22) Filed: Jul. 19, 2017

(65) Prior Publication Data

US 2018/0031445 A1 Feb. 1, 2018

(30) Foreign Application Priority Data

Jul. 27, 2016 (JP) ................................ 2016-147872

(51) Int. Cl.

| | |
|---|---|
| ***B06B 1/04*** | (2006.01) |
| ***G01H 1/06*** | (2006.01) |
| ***G01H 1/08*** | (2006.01) |
| ***G01H 11/04*** | (2006.01) |
| ***G01H 13/00*** | (2006.01) |
| ***G01M 7/02*** | (2006.01) |
| ***G01M 13/028*** | (2019.01) |

(52) U.S. Cl.

CPC ........... *G01M 13/028* (2013.01); *B06B 1/045* (2013.01); *G01H 13/00* (2013.01); *G01M 7/02* (2013.01); *G01H 1/06* (2013.01); *G01H 1/08* (2013.01); *G01H 11/04* (2013.01)

(58) Field of Classification Search

CPC ........ G01M 7/02; G01M 13/028; G01H 1/06; G01H 1/08; G01H 11/04; G01H 13/00; B06B 1/045

See application file for complete search history.

(56) References Cited

U.S. PATENT DOCUMENTS 3,610,610 A * 10/1971 Chassagne ................ F16F 1/37 267/152
4,019,374 A * 4/1977 Tierney .................. B06B 1/045 73/666
5,983,701 A * 11/1999 Hassani ................ G01N 3/307 73/12.01

(Continued)

FOREIGN PATENT DOCUMENTS

WO 2014/109365 A1 7/2014

*Primary Examiner* — Randy W Gibson

(74) *Attorney, Agent, or Firm* — Carrier Blackman & Associates, P.C.; Joseph P. Carrier; Fulchand P. Shende

(57) ABSTRACT

A vibration-sensor-integrated vibration exciter 4 has a chassis 21, an excitation unit 22, a magnet 23, a yoke 24, a vibration sensor 25, a fixed plate 26, a moving plate 27, coil springs 28*a* to 28*d*, a retaining plate 29, and a crisscross plate 30. Shafts 31*a* to 31*d* are fixed to the fixed plate 26. The excitation unit 22 is fixed to the crisscross plate 30. Four vibration-proof rubber members 32*a* to 32*d* are installed to the crisscross plate 30 at 90-degree pitches with same radius centering on the excitation axis of the fixed excitation unit 22. The crisscross plate 30 is installed to the retaining plate 29 through the vibration-proof rubber members 32*a* to 32*d*. A vibration applied to the chassis 21 is absorbed by the vibration-proof rubber members 32*a* to 32*d*, to prevent the yoke 24 from being dislocated in lateral direction due to the vibration.

4 Claims, 6 Drawing Sheets

(56) References Cited

U.S. PATENT DOCUMENTS

| | | | | |
|---|---|---|---|---|
| 6,378,672 | B1 * | 4/2002 | Wakui | F16F 15/005 188/378 |
| 2006/0054842 | A1 * | 3/2006 | Kawasaki | B65H 5/38 250/559.04 |

* cited by examiner

EXCITATION INSTRUCTION UNIT
VIBRATION ACQUIRING UNIT
FREQUENCY ANALYZING UNIT
PANEL QUALITY DETERMINING UNIT
NON-DEFECTIVE PANEL DB
ROBOT CONTROLLER
MOVING UNIT

VIBRATION EXCITER

BACKGROUND OF THE INVENTION

Field of the Invention

The present invention relates to a vibration exciter having a vibration sensor.

Description of the Related Art

There has been known a panel inspection apparatus adapted to determine whether sheet-metal panels (works) formed by press molding or the like are non-defective (refer to, for example, International Publication WO2014/109365A1). The panel inspection apparatus described in International Publication WO2014/109365A1 performs inspections by using a vibration-sensor-integrated vibration exciter provided with a vibration sensor which detects the resonance vibration of a panel, and an excitation unit which vibrates a panel.

In the panel inspection apparatus described in International Publication WO2014/109365A1, the vibration-sensor-integrated vibration exciter includes a chassis, in which an excitation unit is disposed, a magnet fixed inside the chassis, and a yoke (vibration generating section), which is formed integrally with the excitation unit and retained to the chassis by a flexible retainer and which generates a vibration by a wound coil cooperatively with the magnet.

In the panel inspection apparatus described in International Publication WO2014/109365A1, the magnet and the vibration generating section are close to each other, and if a vibration is applied to the vibration-sensor-integrated vibration exciter from outside, then the vibration generating section is inconveniently dislocated in a lateral direction and comes in contact with the magnet in some cases. If the vibration generating section comes in contact with the magnet, then the vibration cannot be accurately detected.

SUMMARY OF THE INVENTION

The present invention has been made in view of the background described above, and it is an object of the invention to provide a vibration exciter capable of preventing the lateral dislocation of a vibration generating section.

A vibration exciter in accordance with the present invention includes: a chassis;

a magnet fixed to an interior of the chassis; an excitation unit which comes in contact with a work to vibrate the work; a vibration generating unit which is integral with the excitation unit, around which a coil is wound, and which generates a vibration cooperatively with the coil and the magnet; a vibration sensor which is installed on an excitation axis of the excitation unit and which detects a resonance vibration of the work that is being vibrated; a support member which supports the excitation unit; and vibration-proof members which retain the support member at three or more locations equidistant in a radial direction from the excitation axis of the excitation unit and spaced at regular intervals in a circumferential direction, and which are mechanically fixed to the chassis in such a state as to retain the support member.

The vibration exciter in accordance with the present invention has the vibration-proof members which retain the support member, which supports the excitation unit, at three or more locations equidistant in a radial direction from the excitation axis of the excitation unit and spaced at regular intervals in a circumferential direction, and which are mechanically fixed to the chassis in such a state as to retain the support member. With this arrangement, a vibration applied to the chassis from outside is absorbed by the vibration-proof members, thus making it possible to prevent the vibration from being transmitted to the vibration generating unit. Thus, the dislocation of the vibration generating unit in the lateral direction caused by a vibration can be prevented.

Further, the distal end surface of the excitation unit, which distal end surface comes in contact with the work, is preferably formed in a spherical surface that provides a constant distance from the distal end surface to the vibration sensor.

With this arrangement, even if a work tilts, the distance from the vibration sensor to the point of contact between the distal end surface of the excitation unit and a work will be maintained to be unchanged. This makes it possible to reduce a change in the position of contact between the excitation unit and a work, as compared with an excitation unit having a linear surface that comes in contact with a work, when the work tilts. In addition, the frictional force at the portion of contact between the excitation unit and a work can be also reduced, as compared with the excitation unit having a linear surface that comes in contact with a work.

Further, the vibration exciter is preferably provided with a pressing unit which presses the excitation unit against the work so as to prevent the excitation unit from coming off the work in the case where a vibration is applied by the excitation unit.

This arrangement makes it possible to prevent the excitation unit from coming apart from a work during a vibration.

The present invention makes it possible to prevent a vibration generating unit from being dislocated in the lateral direction due to vibration.

DESCRIPTION OF THE PREFERRED EMBODIMENTS

The following will describe an embodiment of the present invention with reference to the accompanying drawings.

Figure 1:
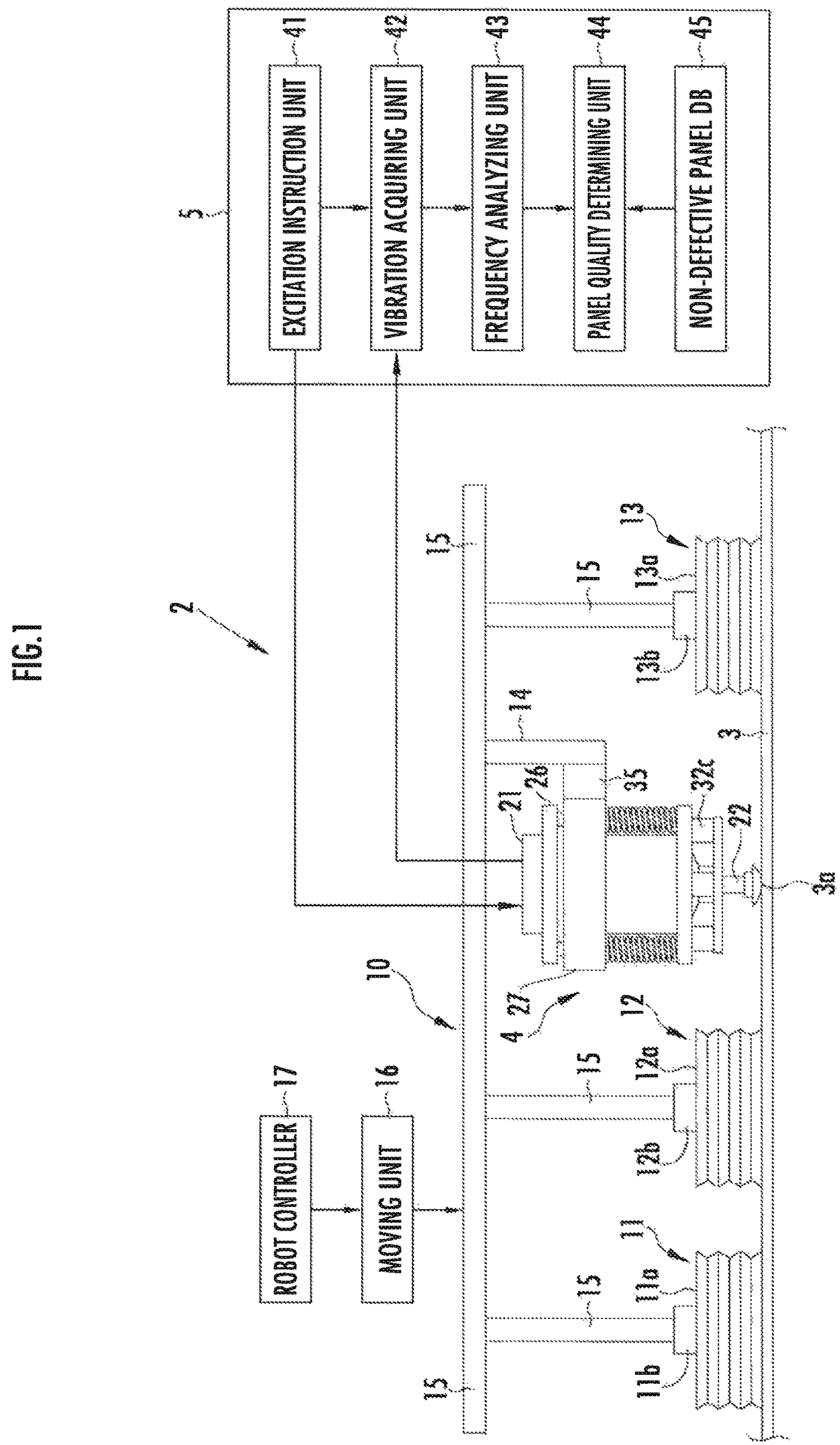
FIG. 1 is a schematic diagram illustrating the configuration of a panel inspection apparatus including a vibration-sensor-integrated vibration exciter in accordance with the present invention.
Figure 2:
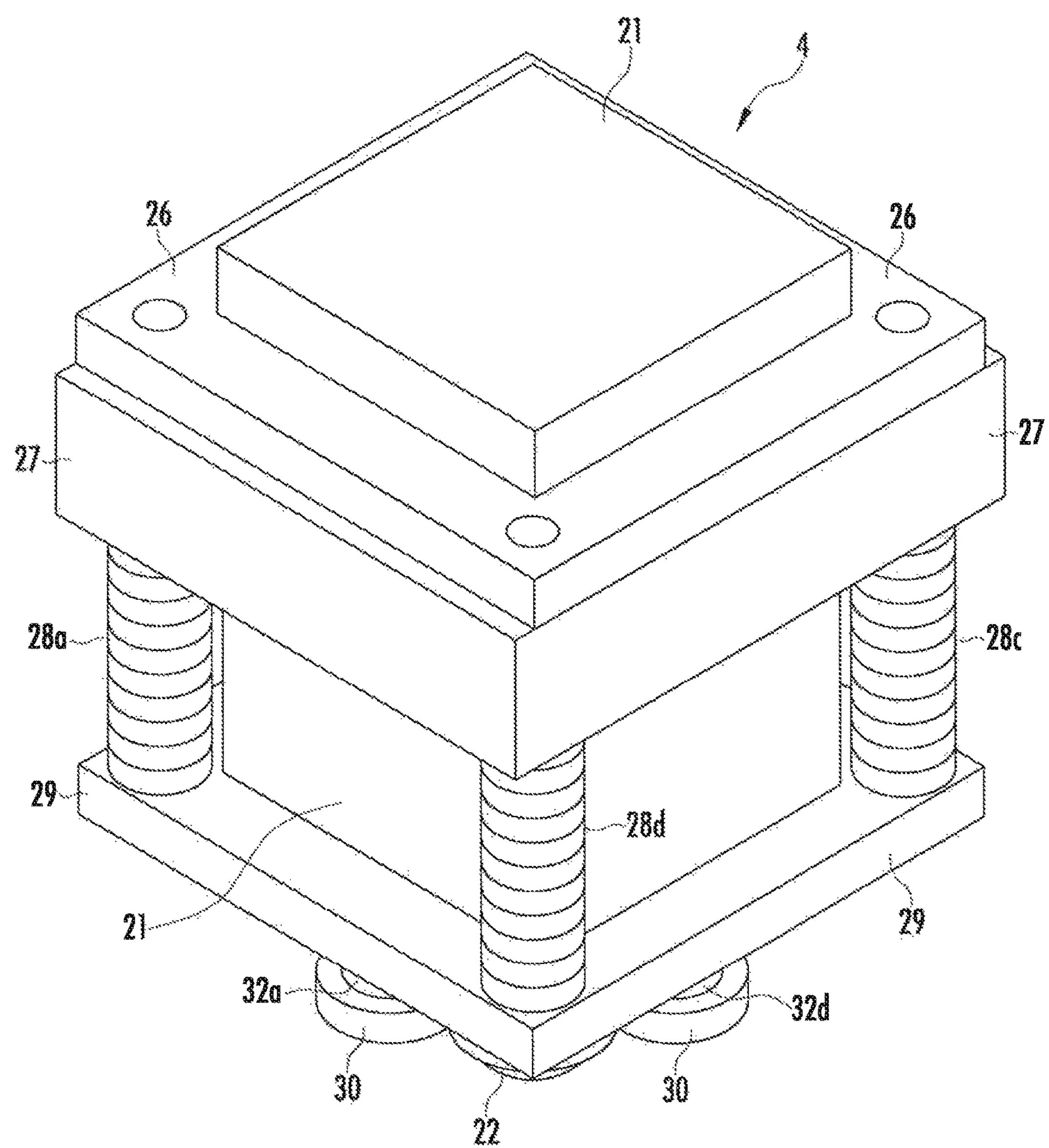
FIG. 2 is a perspective view illustrating a vibration-sensor-integrated vibration exciter.
Figure 3:
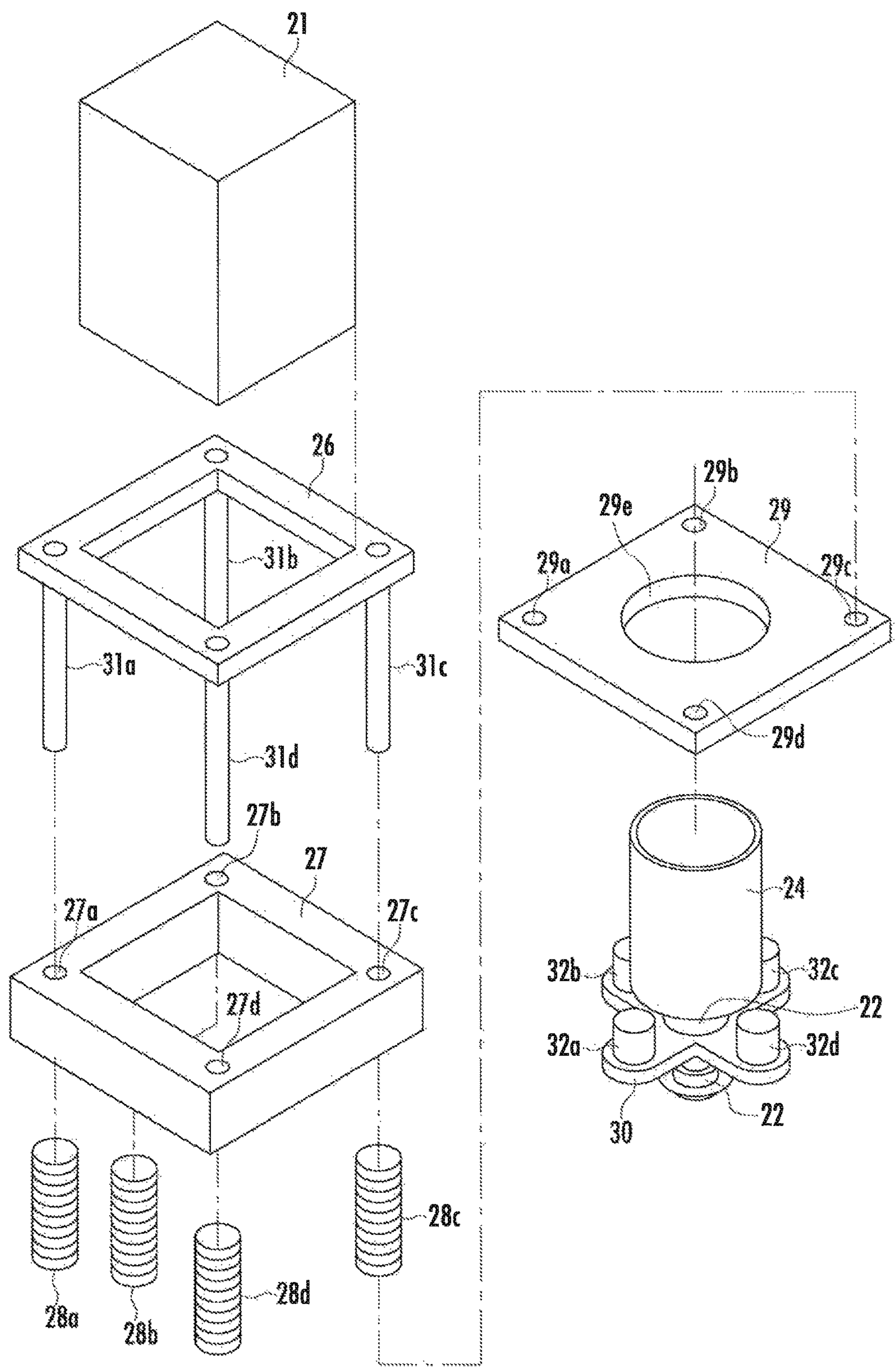
FIG. 3 is an exploded perspective view of the vibration-sensor-integrated vibration exciter.
Figure 4:
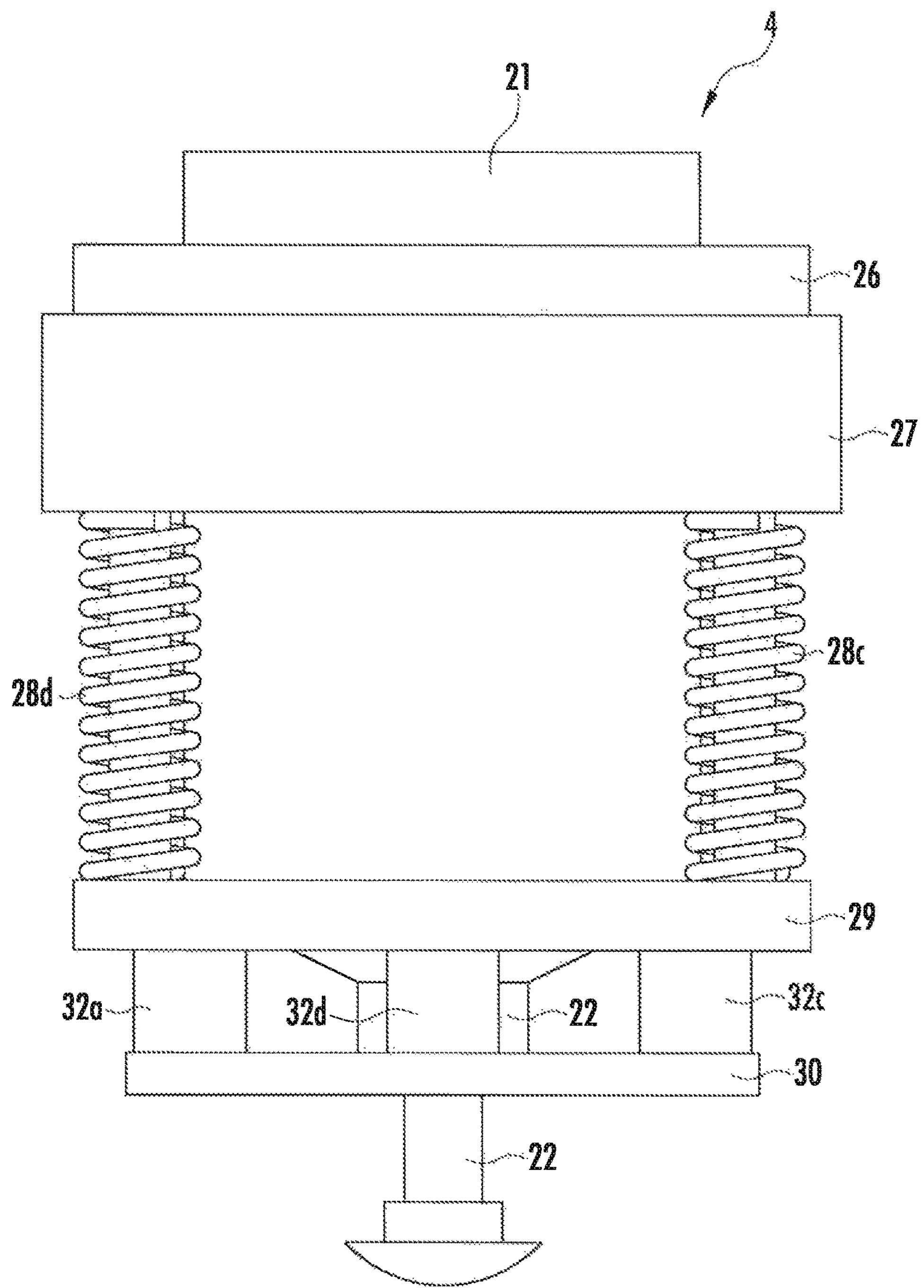
FIG. 4 is a side view of the vibration-sensor-integrated vibration exciter.

As illustrated in FIG. 1, a panel inspection apparatus 2 includes a vibration-sensor-integrated vibration exciter 4, which vibrates a sheet-metal panel 3 (work), which is an object to be inspected and which is formed by, for example, press molding, to detect a resonance vibration of the panel 3 caused by the vibration, and a controller 5 which controls the vibration-sensor-integrated vibration exciter 4. The panel 3 is, for example, a hood of a vehicle.

The panel 3 is conveyed by a transfer robot 10. The panel inspection apparatus 2 is configured to bring the vibration-sensor-integrated vibration exciter 4 into contact with an excitation point 3*a*, which is a part of the panel 3, while the panel 3 is being conveyed by the transfer robot 10 and to vibrate the panel 3 so as to cause the panel 3 to resonate, thus acquiring the vibration of the panel 3 by the vibration-sensor-integrated vibration exciter 4.

To be specific, when the controller 5 outputs a voltage waveform to the vibration-sensor-integrated vibration exciter 4, a vibration exciter amplifier (not illustrated) converts a voltage into a current that is proportional to the voltage and outputs the obtained current to the vibration-sensor-integrated vibration exciter 4. The current output causes the vibration-sensor-integrated vibration exciter 4 to excite the excitation point 3*a*, which is at one end portion of the panel 3, thereby causing the panel 3 to resonate. Then, the vibration-sensor-integrated vibration exciter 4 detects a composite vibration, including the resonance, at the excitation point 3*a*, and supplies the composite vibration to the controller 5. Further, as will be discussed in detail later, the detected vibration including the resonance vibration is processed by the controller 5 so as to extract a resonance frequency of the panel 3, and the resonance frequency of the panel 3 is compared with the resonance frequency of a non-defective panel that has been measured in advance, thereby determining whether the quality of the panel 3 is good or not.

The transfer robot 10 has a plurality of suction units (three suction units 11 to 13 illustrated in FIG. 1), which suctions the panel 3, a retainer 14 which retains the vibration-sensor-integrated vibration exciter 4, arms 15 to which the suction units 11 to 13 and the retainer 14 are fixed, a moving unit 16 which has a motor or the like to move the arms 15, and a robot controller 17. The arms 15 are movably installed to a rail (not illustrated). The moving unit 16 is driven to move the arms 15 along the rail thereby to convey the sucked panel 3 by the suction units 11 to 13. The drive of the moving unit 16 is controlled by the robot controller 17.

The suction unit 11 has a main body 11*a* made of, for example, rubber, and shaped like a bellows, and suction section 11*b* which suctions air from inside the main body 11*a*. With the distal end surface of the main body 11*a* in contact with the panel 3, the suction section 11*b* is driven to suction air from the interior of the main body 11*a*, the panel 3 is suctioned. When the drive of the suction section 11*b* is stopped, the suction of the panel 3 is cleared. As with the suction unit 11, the suction units 12 and 13 include main bodies 12*a* and 13*a*, respectively, and suction sections 12*b* and 13*b*, respectively. The drive of the suction sections 11*b* to 13*b* is controlled by the robot controller 17.

[Configuration of the Vibration-Sensor-Integrated Vibration Exciter 4]

Referring to FIG. 2 to FIG. 5, the vibration-sensor-integrated vibration exciter 4 includes a chassis 21 composed of an iron magnetic circuit, an excitation unit 22 which vibrates the panel 3, and a magnet 23 fixed to the inner wall of the upper surface of the chassis 21. Further, the vibration-sensor-integrated vibration exciter 4 is formed integrally with the excitation unit 22, and has a yoke 24 (a vibration generating section) which generates a vibration cooperatively with the magnet 23 by a wound coil (not illustrated).

The distal end surface (the lower end surface in FIG. 1 to FIG. 5) of the excitation unit 22 is formed to have a spherical surface, and the spherical distal end surface comes in contact with the panel 3. The distal end surface of the excitation unit 22 is formed to be spherical such that the distance from a vibration sensor 25, which will be discussed later, to the distal end surface of the excitation unit 22 remains constant. Hence, even if the panel 3 sways and tilts (as indicated by the two-dot chain line in FIG. 5), the distance from the vibration sensor 25 to the point of contact between the excitation unit 22 and the panel 3 is maintained to be unchanged. This makes it possible to reduce a change in the position of contact between the excitation unit 22 and the panel 3 when the panel 3 sways and tilts, as compared with an excitation unit in which the surface coming in contact with the panel 3 is linear. Further, the frictional force at a portion of contact between the excitation unit 22 and the panel 3 can be also reduced, as compared with the excitation unit having the linear surface that comes in contact with the panel 3. The shape of the distal end surface of the excitation unit 22 can be changed as necessary. The term "remains constant" includes a case where a slight difference is involved.

The vibration-sensor-integrated vibration exciter 4 includes the vibration sensor 25, which is installed integrally with the excitation unit 22 on the excitation axis of the excitation unit 22 inside the yoke 24 to detect a resonance vibration generated from the panel 3 that is being vibrated.

Further, the vibration-sensor-integrated vibration exciter 4 has a fixed plate 26 secured to the outer periphery of the upper end portion of the chassis 21, a moving plate 27, coil springs 28*a* to 28*d* (pressing unit), a retaining plate 29, and a cross-shaped crisscross plate 30 (support member) to which the excitation unit 22 is fixed. The number of the coil springs can be changed as necessary. Further, leaf springs or the like may be used in place of the coil springs, or further alternatively, a pneumatic pressing mechanism or the like may be used for the pressing purpose.

The fixed plate 26 is secured to the outer periphery of the upper end portion of the chassis 21, and shafts 31*a* to 31*d*, which extend downward and movably support the moving plate 27 are fixed to the four corners of the fixed plate 26.

In the moving plate 27, insertion holes 27*a* to 27*d* through which the shafts 31*a* to 31*d*, respectively, are passed are formed at the four corners corresponding to the shafts 31*a* to 31*d*. A mounting plate 35 (refer to FIG. 1) is attached to the moving plate 27. The mounting plate 35 is held by the retainer 14 (refer to FIG. 1) of the transfer robot 10.

The shafts 31*a* to 31*d* passed through the insertion holes 27*a* to 27*d* of the moving plate 27 are inserted in the coil springs 28*a* to 28*d*, respectively. The upper surfaces of the coil springs 28*a* to 28*d* are in contact with the lower surface of the moving plate 27.

Formed in the retaining plate 29 are insertion holes 29*a* to 29*d* in which the shafts 31*a* to 31*d*, which have been inserted in the coil springs 28*a* to 28*d*, are passed through and fixed, and an insertion hole 29*e* through which the yoke 24 is passed. The lower surfaces of the coil springs 28*a* to 28*d* are in contact with the upper surface of the retaining plate 29. When the retaining plate 29 is fixed to the shafts 31*a* to 31*d*, the coil springs 28*a* to 28*d* are compressed and spring-charged. The spring forces of the coil springs 28*a* to 28*d* urge the moving plate 27 upward, so that the upper surface of the moving plate 27 is in contact with the lower surface of the fixed plate 26.

Figure 5:
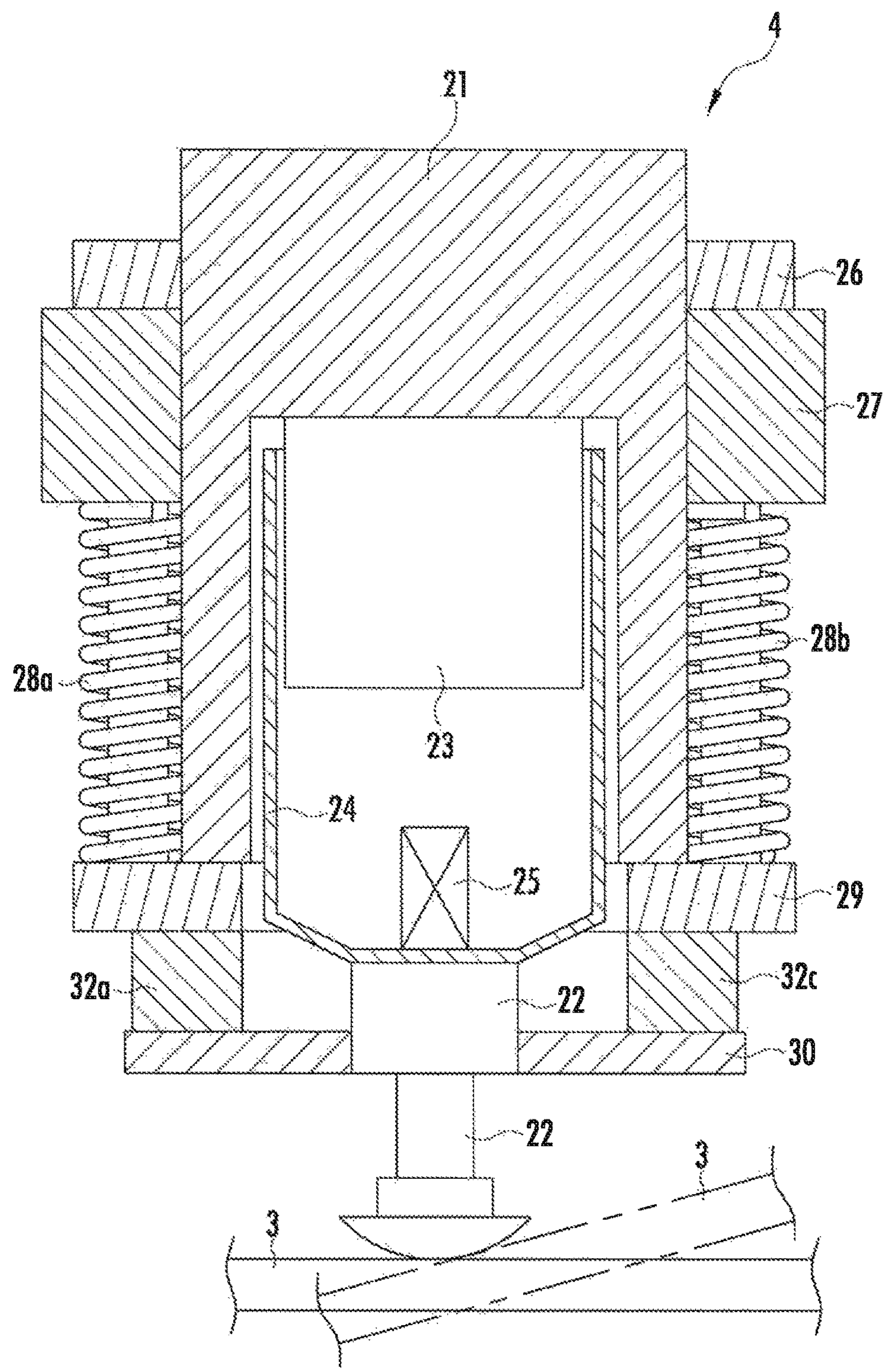
FIG. 5 is a sectional view of the vibration-sensor-integrated vibration exciter.

The excitation unit 22 is fixed to the crisscross plate 30, with the distal end portion of the excitation unit 22 (the lower end portion in FIG. 1 to FIG. 5) being passed through. The crisscross plate 30 has four vibration-proof rubber members 32*a* to 32*d* (vibration-proof members) provided equidistantly in the radial direction from the excitation axis of the excitation unit 22 that has been fixed, and at 90-degree pitches in the circumferential direction. The vibration-proof rubber members 32*a* to 32*d* are in contact with the lower surface of the retaining plate 29. FIG. 5 does not illustrate the sections of the excitation unit 22 and the magnet 23.

The crisscross plate 30 is attached to the retaining plate 29 by mounting screws (not illustrated) through the intermediary of the vibration-proof rubber members 32*a* to 32*d*. The excitation unit 22 is urged downward by the spring forces of the coil springs 28*a* to 28*d* through the intermediary of the retaining plate 29, the vibration-proof rubber members 32*a* to 32*d*, and the crisscross plate 30. The vibration-proof rubber members 32*a* to 32*d* may be disposed at different positions in the direction of the excitation axis.

According to the present embodiment, for example, the excitation force produced by the excitation unit 22 at the time of excitation by the vibration-sensor-integrated vibration exciter 4 is 7.5 N, and the force generated in the vibration-sensor-integrated vibration exciter 4 by the acceleration when the panel 3 is conveyed is 6.37 N. If the sway width of the panel 3 is ±2 mm, then a force of 16.17 N is required as the force of pressing the excitation unit 22. In the present embodiment, for example, the spring constants of the coil springs 28*a* to 28*d* are set to 0.29 N/mm, the initial amounts of compression of the coil springs 28*a* to 28*d* when the coil springs 28*a* to 28*d* are attached to the vibration-sensor-integrated vibration exciter 4 are set to 11 mm, the amounts of compression of the coil springs 28*a* to 28*d* (the amounts of compression added to the initial amount of compression) are set to 6 mm when the panel 3 is suctioned (at a start of the inspection), and the pressing force of the excitation unit 22 is set to 19.7 N. The spring constants of the vibration-proof rubber members 32*a* to 32*d* are 49 N/mm, and the coil springs 28*a* to 28*d* are compressed even when a force is applied to the excitation unit 22.

As a comparative example, if, for example, the spring constants of the coil springs 28*a* to 28*d* are set to 0.49 N/mm, the initial amounts of compression of the coil springs 28*a* to 28*d* when the coil springs 28*a* to 28*d* are attached to the vibration-sensor-integrated vibration exciter 4 are set to 4 mm, and the amounts of compression of the coil springs 28*a* to 28*d* at a start of the inspection is set to 6 mm, the pressing force of the excitation unit 22 will be 19.6 N. However, in the case of the comparative example, the spring constants are larger (0.49 N/mm) than those in the present embodiment (0.29 N/mm), so that the amount of change in the pressing force of the excitation unit 22 when the coil springs 28*a* to 28*d* are compressed due to the force applied to the excitation unit 22 will be larger than that in the present embodiment. The present embodiment makes it possible to reduce the amount of change in the pressing force of the excitation unit 22 when a force is applied to the excitation unit 22 and the coil springs 28*a* to 28*d* are compressed, as compared with the comparative example.

Even if a vibration is applied from outside to the chassis 21 of the vibration-sensor-integrated vibration exciter 4 while, for example, the transfer robot 10 is conveying the panel 3, the vibration will be absorbed by the vibration-proof rubber members 32*a* to 32*d*. This prevents the vibration from being transmitted to the yoke 24, thus preventing the vibration from being transmitted to the vibration sensor 25 installed inside the yoke 24. In addition, since the vibration is absorbed by the vibration-proof rubber members 32*a* to 32*d*, the yoke 24 will not be dislocated in the lateral direction due to a vibration. Thus, it is possible to prevent the yoke 24 from coming in contact with the chassis 21 or the magnet 23.

Further, the crisscross plate 30 is urged downward by the spring forces of the coil springs 28*a* to 28*d* through the intermediary of the retaining plate 29, and the yoke 24 formed integrally with the excitation unit 22 fixed to the crisscross plate 30 is also urged downward. Therefore, even if an external vibration is applied to the chassis 21 of the vibration-sensor-integrated vibration exciter 4, the yoke 24 will not be dislocated upward. Thus, the yoke 24 and the magnet 23 can be retained at the same positions in the vertical direction, and therefore the yoke 24 can be prevented from coming in contact with the inner wall of the upper surface of the chassis 21.

The vibration-sensor-integrated vibration exciter 4 is configured such that the excitation unit 22 vibrates in a vibration direction (in the vertical direction in FIG. 1 to FIG. 5) so as to excite the excitation point 3*a* of the panel 3, and the vibration sensor 25 detects a resonance vibration generated in the panel 3 by the excitation. The phrase "on the excitation axis" of the excitation unit 22 refers to the position and the orientation at which the vibration in the vibration direction can be measured. In the present embodiment, the vibration sensor 25 is installed such that the excitation axis of the excitation unit 22 and the axis of the vibration sensor 25 lie on the same axis, and the vibration sensor 25 is installed on the excitation axis of the excitation unit 22.

The necessity of the vibration sensor 25 being installed on the excitation axis of the excitation unit 22 will be described. The resonance vibration waveform acquired by a vibration sensor changes depending on where the vibration sensor is installed on an object to be inspected. In a worst case, if the position of the vibration sensor corresponds to a node of a resonance vibration, then the vibration cannot be detected. The installation position of the vibration sensor at which a vibration cannot be measured changes according to a vibration frequency and the condition of a panel, thus making it difficult to identify the specific position. If the vibration sensor should be installed at such a position, then a non-defective work may be erroneously determined to be defective, or a defective work may be determined to be non-defective. It is known that a resonance waveform always has a maximum amplitude at the excitation point and a work end, which is an open end. Therefore, placing the vibration sensor 25 at the work end, which is the open end, enables the detection to be accomplished at a position of the maximum amplitude. However, if a panel has a complicated shape, then it is difficult to determine where the work end is, and even if the position of a work end is identified, there is a plurality of work ends, so that a plurality of sensors must be disposed. For this reason, the vibration sensor 25 is preferably installed on the excitation axis of the excitation unit 22 that comes in contact with the excitation point 3*a*.

The excitation unit 22 is configured such that, when a desired current waveform is supplied to a coil (not illustrated) wound around the yoke 24 integrally formed with the excitation unit 22, the excitation unit 22 vibrates cooperatively with the magnet 23 in a waveform based on a supplied desired voltage waveform. More specifically, supplying the desired current waveform to the coil of the yoke 24 causes the yoke 24 to develop a magnetic force, causing the yoke 24 to be attracted to and repelled against the magnet 23 within a movable range of the yoke 24 thereby to vibrate the excitation unit 22 formed integrally with the yoke 24. The vibration of the excitation unit 22 excites the excitation point 3*a* of the panel 3, which has come in contact with the excitation unit 22, and the vibration imparted to the excitation point 3*a* is reflected, causing the panel 3 to resonate.

The vibration sensor 25 is configured to detect a composite vibration including the resonance vibration of the panel 3, which is a response to the excitation by the excitation unit 22. In other words, the vibration sensor 25 is installed on the excitation axis of the excitation unit 22, so that the vibration sensor 25 detects the composite vibration including the excitation vibration, which is the vibration of the excitation unit 22 itself, in addition to the resonance vibration. The vibration sensor 25 preferably uses a small-sized, high-accuracy acceleration sensor capable of measuring vibrations. Further, the vibration sensor 25 preferably uses a sensor incorporating a field effect transistor (FET) amplifier in the acceleration sensor and is preferably electrically isolated by an insulator from the movable shaft of the excitation unit 22. Since the excitation unit 22 generates a vibration by using the magnetic force, if the vibration sensor 25 is electric charge type, then there will be the influence of noises attributable to the magnetic force and the vibration. However, the sensor incorporating the FET amplifier can suppress the influence of noises to a minimum.

[Configuration of the Controller 5]

Referring back to FIG. 1, the controller 5 is configured by including a control unit which carries out various types of arithmetic processing, a storage unit which stores various types of information, an input unit, such as a keyboard, through which an operator enters various types of data or instructions, and a display unit, such as a display, which displays the results of various types of arithmetic processing in the form of images. The controller 5 has various programs installed therein, and the control unit operates according to the programs to implement the panel inspection function unique to the present invention. The panel inspection function is a function for inspecting the quality of the panel 3 by measuring and analyzing a resonance vibration. The control unit creates a voltage waveform to be output to the vibration-sensor-integrated vibration exciter 4, extracts a resonance vibration from a detection signal of a vibration input from the vibration-sensor-integrated vibration exciter 4, and analyzes the extracted resonance vibration to inspect whether the quality of the panel 3 is non-defective or defective.

The controller 5 includes an excitation instruction unit 41, a vibration acquiring unit 42, a frequency analyzing unit 43, a panel quality determining unit 44, and a non-defective panel DB 45 which has the resonance frequency of a non-defective panel.

The excitation instruction unit 41 is adapted to generate a desired voltage waveform and output the voltage waveform to the excitation unit 22 so as to vibrate the excitation unit 22.

The voltage waveform output from the excitation instruction unit 41 is preferably a swept sine waveform. Regarding the swept sine wave, the reason why the waveform to be generated is more preferably the swept sine wave than a multi-sine waveform is described in detail in International Publication WO2014/109365A1.

The vibration acquiring unit 42 acquires a composite vibration, in which the excitation vibration and the resonance vibration are superimposed, from the vibration sensor 25.

The frequency analyzing unit 43 converts the composite vibration acquired by the vibration acquiring unit 42 into a frequency waveform, and extracts only a resonance frequency from the frequency waveform. More specifically, in the frequency waveform converted by the vibration acquiring unit 42, a frequency indicating a vibration intensity that exceeds a predetermined threshold value is determined and extracted as the resonance frequency of the panel 3. To convert the frequency, the fast Fourier transformation or the maximum entropy method can be applied, but the maximum entropy method is preferably applied. Regarding the maximum entropy method, the reason why the maximum entropy method is preferably applied to the frequency conversion is described in detail in International Publication WO2014/109365A1.

The panel quality determining unit 44 compares the resonance frequency extracted by the frequency analyzing unit 43 with the resonance frequency range of the non-defective panel stored in the non-defective panel DB 45 so as to determine whether the panel 3 is non-defective or defective.

Figure 6:
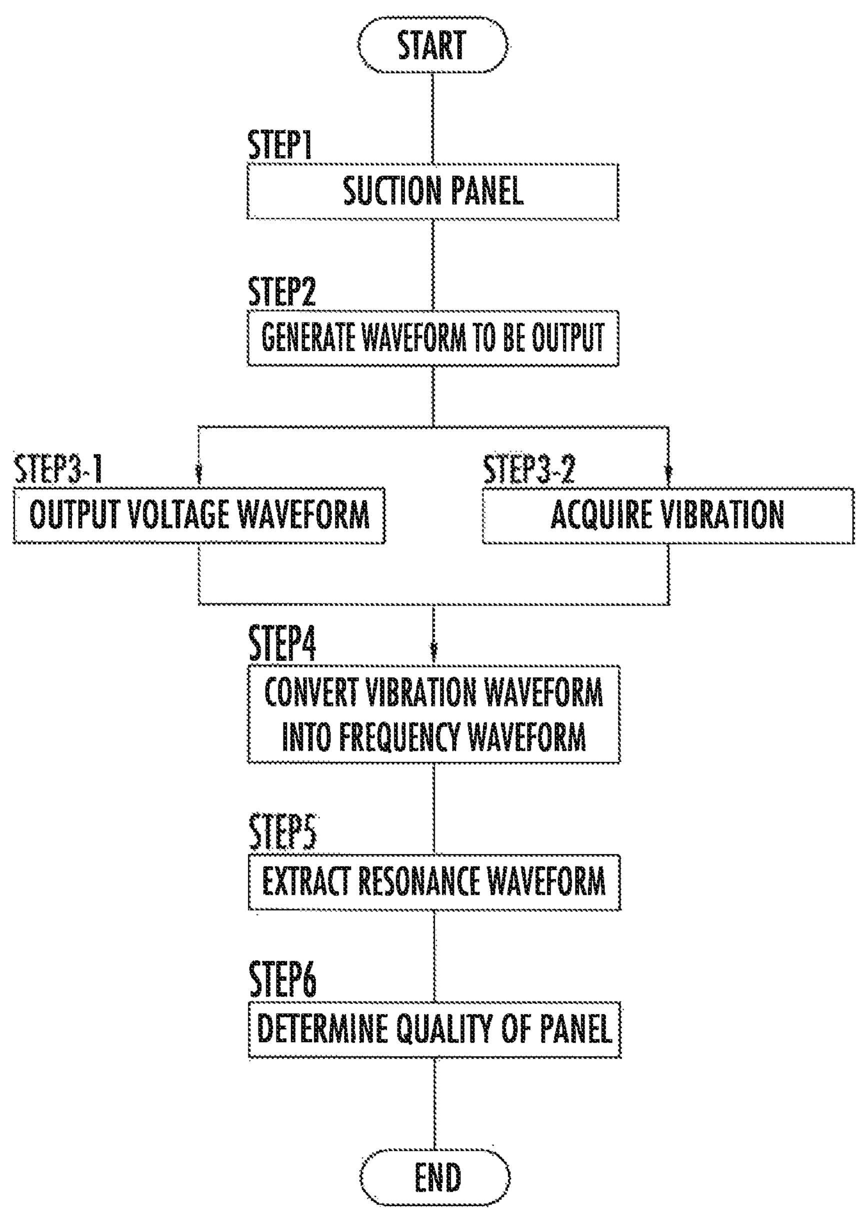
FIG. 6 is a flowchart illustrating the flow of the processing for inspecting a panel.

Referring now to the flowchart in FIG. 6, the procedure for inspecting the panel 3 by the panel inspection apparatus 2 will be described. The processing for the panel inspection is carried out during conveyance. Carrying out the processing for the panel inspection during conveyance makes it possible to determine the quality of the panel 3 merely by mounting the vibration-sensor-integrated vibration exciter 4 on the transfer robot 10 without providing new equipment.

In STEP1, the panel 3 is suctioned by the transfer robot 10. More specifically, the moving unit 16 is driven by the robot controller 17 to carry the transfer robot 10 to a position where the panel 3 is to be suctioned. Then, the suction sections 11*b* to 13*b* of the suction units 11 to 13 are driven by the robot controller 17. As the suction sections 11*b* to 13*b* are driven, the panel 3 is attached to each of the suction units 11 to 13. In this state, the coil springs 28*a* to 28*d* are compressed by 6 mm from the initial state (i.e. before the panel 3 is suctioned).

In STEP2, the excitation instruction unit 41 generates the waveform of the swept sine wave to be applied to the panel 3.

In STEP3-1, the excitation instruction unit 41 outputs a voltage waveform to the excitation unit 22 to generate a vibration based on the swept sine wave generated in STEP2.

In STEP3-2, the vibration acquiring unit 42 acquires the composite vibration of an excitation vibration and a resonance vibration.

In STEP4, the frequency analyzing unit 43 converts the composite vibration, which has been acquired in STEP3-2, into a frequency waveform.

In STEP5, the frequency analyzing unit 43 extracts a resonance frequency from the frequency waveform obtained in STEP4.

In STEP6, the panel quality determining unit 44 compares the resonance frequency extracted in STEP5 with the resonance frequency range of a non-defective panel stored in the non-defective panel DB 45 thereby to determine whether the panel 3 is non-defective or defective.

The above has described an embodiment of the present invention. However, the series of steps of the processing described above can be carried out by hardware or software. In other words, the functional configuration in FIG. 1 is merely an example and is not particularly limited thereto. This means that insofar as a computer is provided with functions that enable the series of steps of the processing described above to be implemented as a whole, the functional blocks to be used to implement the functions are not particularly limited to the example illustrated in FIG. 1. Further, one functional block may be constituted of a single piece of hardware or a single piece of software, or a combination of the hardware and software.

If the series of steps of the processing is carried out by software, then a program constituting the software is installed in a computer or the like from a network or a recording medium. The computer may be a computer incorporated in dedicated hardware. Further, the computer may be a computer, such as a general-purpose personal computer, which is capable of implementing various functions by installing various programs.

In the embodiment described above, four vibration-proof rubber members are used. Alternatively, however, three vibration-proof rubber members may be provided at 120-degree pitches or the crisscross plate 30 may be retained at three or more places of an annular vibration-proof rubber member insofar as the crisscross plate 30 is retained at three or more places which are equidistant in the radial direction from the axis of the excitation unit 22 and are at regular intervals in the circumferential direction, and the crisscross plate 30 is mechanically fixed to the chassis 21 at three or more retaining places.

Further, the fixed plate 26, the moving plate 27, the coil springs 28*a* to 28*d*, and the retaining plate 29 may be deleted. In this case, the vibration-proof rubber members 32*a* to 32*d* will be directly attached to the chassis 21.

What is claimed is:

1. A vibration exciter comprising:

a chassis;

a magnet fixed to an interior of the chassis;

an excitation unit which comes in contact with a work to vibrate the work;

a vibration generating unit which is integral with the excitation unit, around which a coil is wound, and which generates a vibration cooperatively with the coil and the magnet;

a vibration sensor which is installed on an excitation axis of the excitation unit and which detects a resonance vibration of the work that is being vibrated;

a support member which supports the excitation unit;

a retaining plate which has a size larger than a size of the chassis such that an outer portion of the retaining plate extends beyond the chassis; and vibration-proof members which retain the support member at three or more locations equidistant in a radial direction from the excitation axis of the excitation unit and spaced at regular intervals in a circumferential direction, and which are mechanically fixed to the chassis, via the retaining plate by contacting a lower surface of the retaining plate at an outer side than the chassis, in such a state as to retain the support member.

2. The vibration exciter according to claim 1, wherein a distal end surface of the excitation unit that comes in contact with the work is formed to have a spherical surface that provides a constant distance from the distal end surface to the vibration sensor.

3. The vibration exciter according to claim 1, further comprising:

a pressing unit which presses the excitation unit against the work to prevent the excitation unit from being separated from the work in the case where a vibration is imparted by the excitation unit.

4. A vibration exciter comprising:

a chassis;

a magnet fixed to an interior portion of the chassis;

an excitation unit which comes in contact with a work to vibrate the work;

a vibration generating unit which is integral with the excitation unit, around which a coil is wound, and which generates a vibration cooperatively with the coil and the magnet;

a vibration sensor which is installed on an excitation axis of the excitation unit and which detects a resonance vibration of the work that is being vibrated;

a fixed plate which has an outer diameter larger than an outer diameter of the chassis;

a plurality of shafts having one end side attached to the fixed plate;

a moving plate which has an outer diameter larger than an outer diameter of the chassis, and which is provided with a through-hole in which the shafts are inserted;

a support member which supports the excitation unit;

a retaining plate which has a size larger than a size of the chassis such that an outer portion of the retaining plate extends beyond the chassis, and to which other end side of the plurality of shafts is fixed;

a plurality of spring members each of which is inserted into the plurality of shafts, and one end contacts the moving plate and other end contacts the retaining plate, and vibration-proof members which retain the support member at three or more locations equidistant in a radial direction from the excitation axis of the excitation unit and spaced at regular intervals in a circumferential direction, and which are mechanically fixed to the chassis via the retaining plate by contacting a lower surface of the retaining plate at an outer side than the chassis, in such a state as to retain the support member.

* * * * *